P. M. CASADY.
PRESSURE GAGE.
APPLICATION FILED MAY 4, 1914.

1,116,798. Patented Nov. 10, 1914.

Witnesses:
Theo. Lagaard.
H. A. Bowman.

Inventor:
Philip M. Casady,
By F. A. Whiteley
his Attorney.

UNITED STATES PATENT OFFICE.

PHILIP M. CASADY, OF MINNEAPOLIS, MINNESOTA.

PRESSURE-GAGE.

1,116,798.  Specification of Letters Patent.  Patented Nov. 10, 1914.

Application filed May 4, 1914. Serial No. 836,049.

*To all whom it may concern:*

Be it known that I, PHILIP M. CASADY, a citizen of the United States, residing at Minneapolis, in the county of Hennepin and State of Minnesota, have invented certain new and useful Improvements in Pressure-Gages, of which the following is a specification.

My invention relates to gas - pressure gages of that type in which two connected columns of water indicate the force or pressure exerted by the gas upon the surface of one of the columns. The indication is always made by the displacement of the liquid, and the pressure determined by such displacement may either be that which offsets gravity operating upon the column of liquid or a pressure resulting from compression of a certain amount of gas, such as air, in a gas-pipe receptacle.

It is the purpose of my invention to provide a metallic holder which shall be in the form of a longitudinal hollow member for receiving and holding the glass tubes and the scale to be read, said hollow member providing a means of connecting the gage to the gas-pipe in either supported or suspended position, and a passageway for the gas to the exposed top of the column of water. In one form of my invention the supporting standard may provide an air-compression chamber, and separate passageways be afforded therein for the gas. In the preferred form, however, a compression chamber is provided independent of the central member. In either case the gage may be employed either as a gravity gage or a compression gage, the former being useful for indicating very low pressures while the latter is particularly desirable where it is necessary to measure high pressures of gas.

The full objects and advantages of my invention will appear in connection with the detailed description thereof and are particularly pointed out in the claims.

Figure 1:
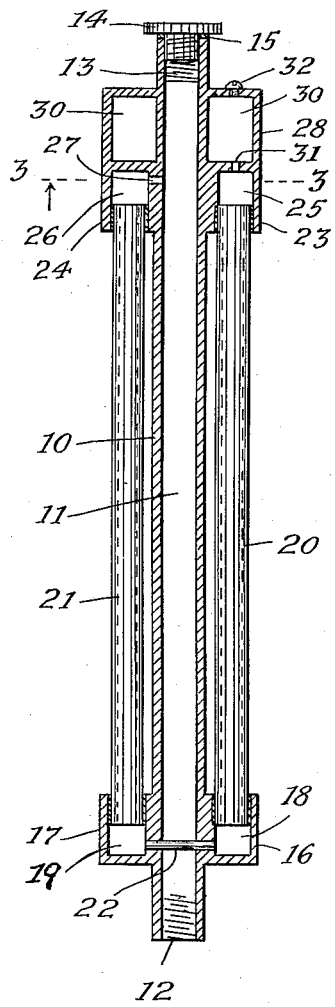
Figure 2:
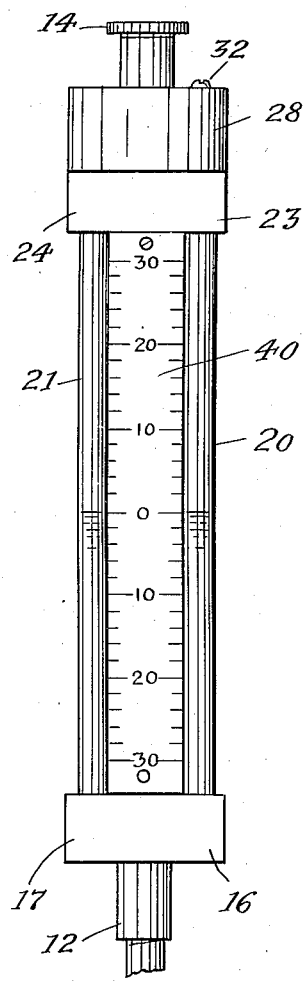
Figure 4:
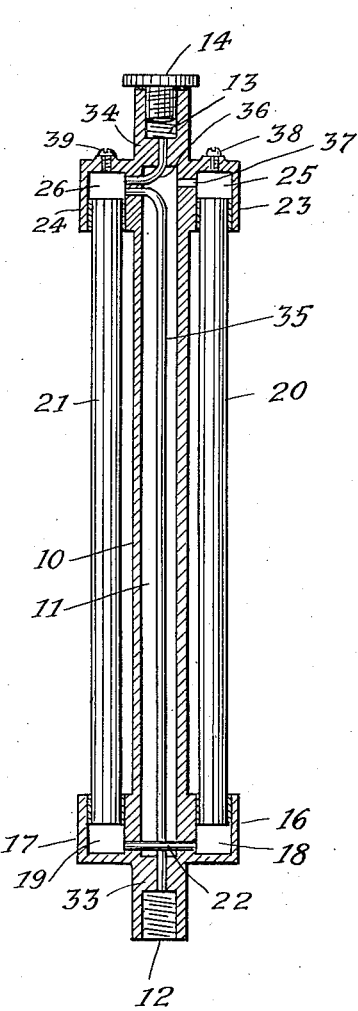
Figure 3:
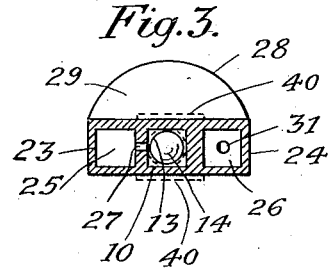

In the drawings, illustrating the application of my invention in one form,—Figure 1 is a sectional elevation of the preferred form of my device. Fig. 2 is a front view of the same. Fig. 3 is a section on line 3—3 of Fig. 1 viewed in the direction of the arrow. Fig. 4 is a sectional view of a modified form of my invention.

As illustrated, I provide a hollow central frame member 10 through which extends a passageway 11, preferably square in cross section, as indicated at 12 in Fig. 3. The hollow member 10 is open at both ends and is provided with circular integrally threaded end portions 12 and 13, in one or the other of which is secured a screw plug 14 which, by means of a washer 15 effects air-tight closure of one end or the other of the hollow member 10. When it is desired to apply the gage to a fixture so that it will stand upright upon the same, the cap 14 is screwed into position, as indicated in Fig. 1, and the threaded end 12 is connected with the gas fixture. When it is desired to suspend the gage from below a pipe and fixture, the cap 14 is screwed into the end 12 and the portion 13 is screwed upon the pipe fixture.

Preferably integrally cast upon the lower portion of member 10, are extensions 16 and 17 forming cups 18 and 19 in which are cemented the lower ends of glass tubes 20 and 21, respectively. The ends of the tubes are set in the cups with air-tight joints and do not extend to the bottom portions thereof, which are connected by a tube 22 extending across the passageway 11 within member 10. At a point near the top of member 10 are similar extensions 23 and 24, forming cups 25 and 26 which receive the upper ends of tubes 20 and 21. As clearly shown in Figs. 1 and 4, these tubes are cemented within cups 25 and 26 so that the ends do not reach the bottoms of said cups. In the preferred form, a passageway 27 connects the passageway 11 within member 10 with the cup cavity 26. In this form, also, an additional casing portion 28, preferably forwardly curved, as indicated in Fig. 3, is cast integrally with the central member 10 and the cup extensions 23 and 24. The outwardly curved portion is provided with a shelf-like floor 29 and forms a compression chamber 30. An opening 31 connects compression chamber 30 with the bottom of cup 25. A screw 32 controls a vent in the top of casing 28 whereby the chamber 30 may be opened to atmospheric pressure for gravity use of the gage, or closed for a gas-compression gage, as may be desired.

In the form shown in Fig. 4, the chamber 30 is omitted and partitions 33 and 34 close passageway 11 outside of the sets of extensions 16, 17 and 23, 24. A pipe 35 extending through partition 33 and within passageway 11 enters cup cavity 26, while a similar pipe 36 extends through passageway 34 and enters cup cavity 26. It thus is apparent that if end 12 is connected with a gas-pipe and end 13 plugged, the gas may flow through pipe 35 within cavity 26 and glass tube 21 to act upon the end of the column of water therein; and when end 13 is connected and end 12 plugged, the gas will flow through pipe 36 with the same result. The passageway 11 is thus closed from the gas stream and, in fact, provides a closed compression chamber, which is connected by means of a passageway 37 with the cup 25 above glass tube 20. A screw 38 controls a vent from cup 25 to permit the gage to operate either as a compression or gravity gage. A similar screw 39 may be employed to control a vent into cavity 26 for the purpose of readily releasing the gas pressure to make check tests or for other purposes.

A scale 40 reading from zero in the center in both directions may be secured directly upon central member 10. Such a scale may be either for reading from the two columns of water in tubes 20 and 21 gravity indications of the gas pressure, or for reading from said columns indications of gas pressure the result of compression of the air in chamber 30 or 11. A scale for each purpose may, if desired, be applied to the opposite sides of the member 10, as indicated in Fig. 3.

The simplicity of my gage will be apparent. The central member comprises at once a frame support, means for connecting the gage with the gas fixture and a passageway for the gas to the proper end of the column of water in the glass tube 21. The ends of the glass tubes 20 and 21 are securely held and so protected that breakage of said glass tubes will seldom or never take place. The arrangement of the air chamber and the screw-control vent therein makes a readily interchangeable gravity or air-compression gage. The gage is cheaply constructed and cannot get out of order.

I claim:

1. A gas-pressure gage comprising a hollow metallic frame member adapted to be connected at either end to a gas-pipe, projections adjacent the ends of said frame member and integral therewith forming alined pairs of cup-like cavities, a pair of glass tubes having the ends thereof cemented in said cavities, a tube connecting said cavities below the lower ends of said glass tubes, and the wall of said hollow member having an aperture connecting the passageway within the hollow member with one of the cup cavities above the end of one of the glass tubes.

2. A gas-pressure gage comprising a hollow metallic frame member adapted to be connected at either end to a gas-pipe, projections adjacent the ends of said frame member and integral therewith forming alined pairs of cup-like cavities, a pair of glass tubes having the ends thereof cemented in said cavities, a tube connecting said cavities below the lower ends of said glass tubes, the wall of said hollow member having an aperture connecting the passageway within the hollow member with one of the cup cavities above the end of one of the glass tubes, and a casing forming a compression chamber having communication with the cavity above the end of the other glass tube.

3. A gas-pressure gage comprising a hollow metallic frame member adapted to be connected at either end to a gas-pipe, projections adjacent the ends of said frame member and integral therewith forming alined pairs of cup-like cavities, a pair of glass tubes having the ends thereof cemented in said cavities, a tube connecting said cavities below the lower ends of said glass tubes, the wall of said hollow member having an aperture connecting the passageway within the hollow member with one of the cup cavities above the end of one of the glass tubes, a casing forming a compression chamber having communication with the cavity above the end of the other glass tube, and means for opening or closing said compression chamber to atmospheric pressure.

In testimony whereof I affix my signature in presence of two witnesses.

PHILIP M. CASADY.

Witnesses:
F. A. WHITELEY,
H. A. BOWMAN.